US009323350B2

(12) United States Patent
Oda et al.

(10) Patent No.: US 9,323,350 B2
(45) Date of Patent: Apr. 26, 2016

(54) DISPLAY CONTROL DEVICE, DISPLAY CONTROL METHOD, AND RECORDING MEDIUM

(71) Applicant: KONICA MINOLTA, INC., Chiyoda-ku, Tokyo (JP)

(72) Inventors: Akihiko Oda, Toyohashi (JP); Manabu Furukawa, Nagaokakyo (JP); Hiroki Tajima, Toyokawa (JP); Kenzo Yamamoto, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/223,953

(22) Filed: Mar. 24, 2014

(65) Prior Publication Data

US 2014/0285823 A1    Sep. 25, 2014

(30) Foreign Application Priority Data

Mar. 25, 2013    (JP) .................................. 2013-063076

(51) Int. Cl.
| G06F 3/033 | (2013.01) |
| G06F 3/12 | (2006.01) |
| G06K 15/02 | (2006.01) |
| G03G 15/00 | (2006.01) |
| G06K 15/00 | (2006.01) |

(52) U.S. Cl.
CPC ................ *G06F 3/033* (2013.01); *G03G 15/50* (2013.01); *G03G 15/502* (2013.01); *G06K 15/005* (2013.01)

(58) Field of Classification Search
None
See application file for complete search history.

(56) References Cited

U.S. PATENT DOCUMENTS

| 6,344,864 | B1 * | 2/2002 | Watanabe ...................... 715/788 |
| 6,549,681 | B1 * | 4/2003 | Takahashi et al. ............. 382/294 |
| 2001/0024212 | A1 * | 9/2001 | Ohnishi ......................... 345/769 |
| 2005/0078974 | A1 * | 4/2005 | Uchida et al. ................... 399/81 |
| 2006/0290809 | A1 * | 12/2006 | Karasawa et al. ............. 348/468 |
| 2009/0046075 | A1 * | 2/2009 | Kim et al. ...................... 345/173 |
| 2009/0132943 | A1 * | 5/2009 | Minsky et al. ................. 715/767 |
| 2010/0083154 | A1 * | 4/2010 | Takeshita ....................... 715/769 |
| 2010/0088634 | A1 * | 4/2010 | Tsuruta et al. ................. 715/800 |
| 2010/0125806 | A1 * | 5/2010 | Igeta .............................. 715/770 |

(Continued)

FOREIGN PATENT DOCUMENTS

| JP | 2003345491 A | 12/2003 |
| JP | 2005157928 A | 6/2005 |
| JP | 2011-034512 A | 2/2011 |

OTHER PUBLICATIONS

Japanese Office Action (and English translation thereof) dated Mar. 31, 2015, issued in counterpart Japanese Application No. 2013-063076.

(Continued)

*Primary Examiner* — Beniyam Menberu
(74) *Attorney, Agent, or Firm* — Holtz, Holtz & Volek PC

(57) ABSTRACT

A display control device comprises: a display; a movement judgment portion that judges whether or not a second image moves a certain distance by user dragging the second image to an arbitrary position of a first image on the display, a controller that allows the display to show a larger area of the first image at least by reducing the first image in size, if the movement judgment portion judges that the second image moves a certain distance; and an image giving portion that gives the second image to a user desired position on the first image by user dropping the second image at the position.

21 Claims, 17 Drawing Sheets

(56) References Cited

U.S. PATENT DOCUMENTS

| | | | |
|---|---|---|---|
| 2010/0328729 A1* | 12/2010 | Hirao et al. | 358/449 |
| 2013/0083222 A1* | 4/2013 | Matsuzawa et al. | 348/240.3 |
| 2013/0176217 A1* | 7/2013 | Inagaki et al. | 345/157 |
| 2013/0290858 A1* | 10/2013 | Beveridge | 715/740 |
| 2014/0033027 A1* | 1/2014 | Polo et al. | 715/252 |

OTHER PUBLICATIONS

"Lucidchart Mobile—iPad and Android", https://www.youtube.com/watch?v=Kk9MSeQcUeo (accessed Mar. 19, 2015).

* cited by examiner

FIG.10B   FIG.10A
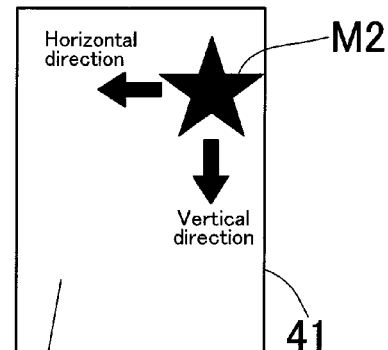
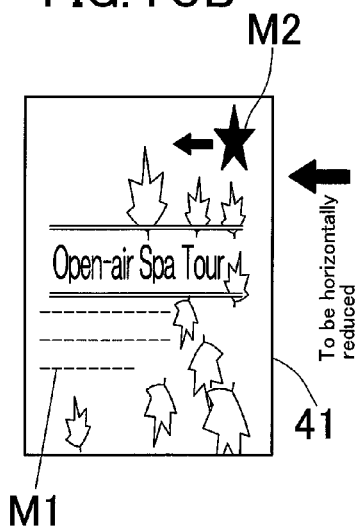
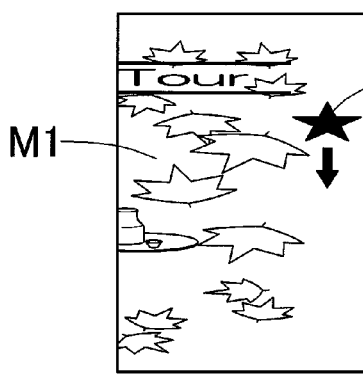
(Original Copy)
FIG.10C   FIG.10D

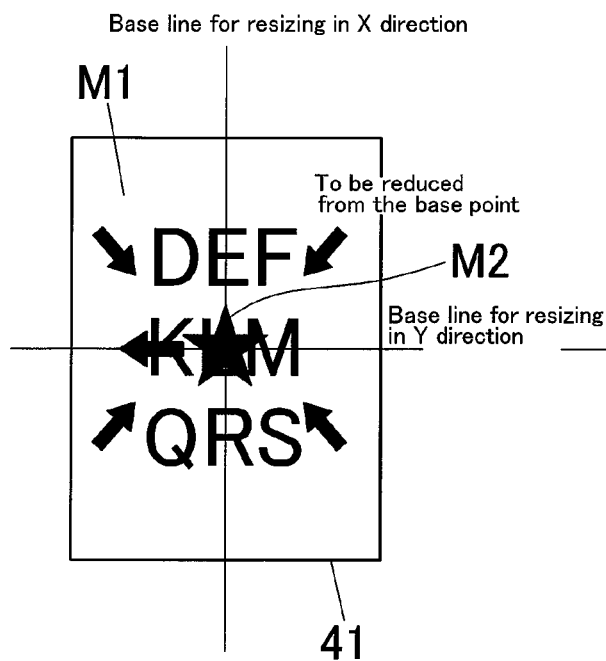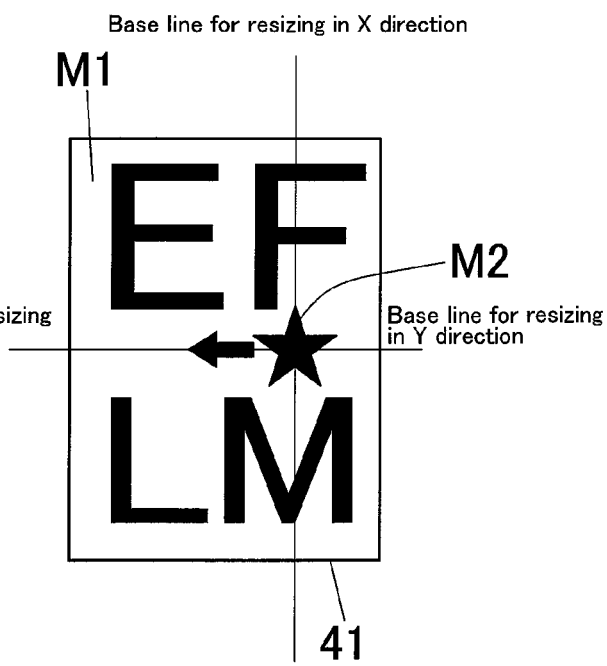
FIG.12B
FIG.12A

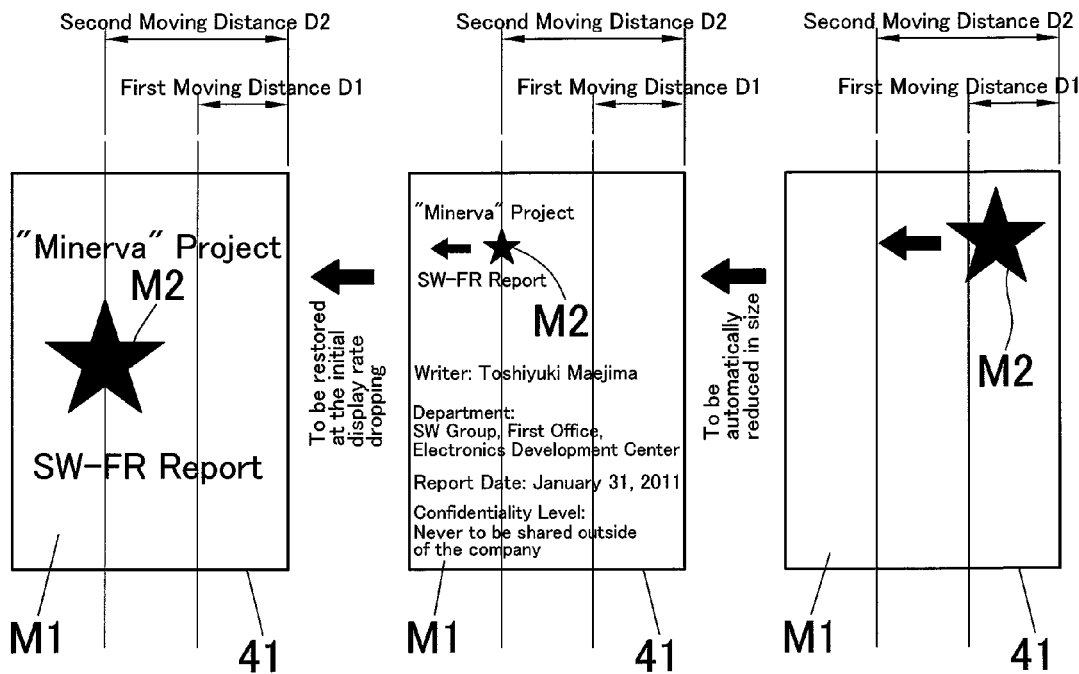

Drop

Keep dragging

Drag

DISPLAY CONTROL DEVICE, DISPLAY CONTROL METHOD, AND RECORDING MEDIUM

This application claims priority under 35 U.S.C. §119 to Japanese Patent Application No. 2013-063076 filed on Mar. 25, 2013, the entire disclosure of which is incorporated herein by reference in its entirety.

BACKGROUND OF THE INVENTION

1. Field of the Invention

The present invention relates to: a display control device having a touch-enabled display on its operation panel, which is generally installed on an image forming apparatus, for example; a display control method for the display control device; and a recording medium having a display control program being stored thereon.

2. Description of the Related Art

The following description sets forth the inventor's knowledge of related art and problems therein and should not be construed as an admission of knowledge in the prior art.

Multifunctional digital image forming apparatus such as multi-function peripherals (MFP) and others, having touch-enabled displays on operation panels being installed on the main bodies thereof, have become very popular for recent years, and now users are allowed to edit images by operating touch-screens of the operation panels.

For example, users are now allowed to select a stamp image such as "confidential" or "star" among those stored on recording mediums of the main bodies of the MFPs and others and give it to (incorporate them into) a document image for printing so that the document and the stamp image can be printed together.

The following is to explain how a user operates a touch-screen more specifically: display a first image M1 as a document image on a touch-screen as illustrated in FIG. 16A; with user's finger N, touch a second image M2 (a "star" stamp image in this example), which is shown out of the display area for the first image M1, and drag it into the display area for the first image M1; keep dragging the second image M2 to a desirable position as illustrated in FIG. 16B; and drop the second image M2 at the desirable position to incorporate into the first image M1 by releasing the finger N therefrom as illustrated in FIG. 16C.

Generally, MFPs and others have operation panels whose screens are smaller and lower-resolution than those for personal computers and others; most of the MFPs and others have operation panels that can display only a part of the first image M1 on a screen W as illustrated in FIG. 17.

Thus users are allowed to edit the first image M1 while seeing only a part of it on the screen W. That is, users conventionally edited the first image M1 on a pane-by-pane basis while moving (scrolling) the screen W all around. FIG. 17 illustrates a conventional example in which a user is trying to see another part of the first image M1 by scrolling the screen W toward the arrow head.

As understood from this figure, users had the difficulty in perceiving a full view of the first image M1 including text, symbols, and layout and in dragging the second image M2 to drop exactly at a desirable position on the first image M1.

More specifically, if the first image M1 is almost blank with only a little text as illustrated in FIG. 18 for example, users would have more difficulty in dragging and dropping because they cannot know which part of the first image M1 they are seeing via the screen. The same is true if the first image M1 is full of a tiled pattern P as illustrated in FIG. 19.

Similarly, under the circumstances that users are allowed to see another part of an image by flicking a touch-panel that can display only a part of it, users might be bothered by flicking the touch-panel again and again to finally see a target part of the image. This is because one flick allows only a short moving length on such a touch-panel having a small and limited displayed range for an image. In order to solve this problem, Japanese Unexamined Patent Publication No. 2011-034512 suggests an effective technique to achieve a long moving length by only a slight flick.

The technique described in Japanese Unexamined Patent Publication No. 2011-034512 may allow users to drag the second image M2 such as a "star" stamp image and drop it on the first image M1 that is a document image, by flicking the touch-panel with user's finger N only slightly. However, it does not provide a perfect solution to the outstanding problem: users have the difficulty in perceiving text, symbols, layout, and other elements of the first image M1 and in dragging and dropping, as long as the size of displayed range for the first image M1 is not changed.

Users may configure the touch-panel to display a reduced version of the entire first image M1 on the screen in order to perceive a full view including text, symbols, and layout and drag and drop the second image M2, with no difficulty. However, that would also need them to devote more time to make a reduced version of the first image M1, which is a problem that detracts from user-friendliness.

Users also may configure the touch-panel to display a reduced version of the entire first image M1 on an auxiliary screen in order to perceive a full view thereon and drag and drop the second image M2. However, that would also bother them by the poor visibility when dragging and dropping because the auxiliary screen is often unpractical for its size and its position on the touch-panel.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a display control device comprising:
  a display;
  a movement judgment portion that judges whether or not a second image moves a certain distance by user dragging the second image to an arbitrary position of a first image on the display,
  a controller that allows the display to show a larger area of the first image at least by reducing the first image in size, if the movement judgment portion judges that the second image moves a certain distance; and
  an image giving portion that gives the second image to a user desired position on the first image by user dropping the second image at the position.

A second aspect of the present invention relates to a display control method comprising:
  judging whether or not a second image moves a certain distance by user dragging the second image to an arbitrary position of a first image on a display,
  allowing the display to show a larger area of the first image at least by reducing the first image in size, if the movement judgment portion judges that the second image moves a certain distance; and giving the second image to a user desired position on the first image by user dropping the second image at the position.

A third aspect of the present invention relates to a non-transitory computer-readable recording medium having a display control program being stored thereon to make a computer of a display control device to execute:

judging whether or not a second image moves a certain distance by user dragging the second image to an arbitrary position of a first image on a display, allowing the display to show a larger area of the first image at least by reducing the first image in size, if the movement judgment portion judges that the second image moves a certain distance; and giving the second image to a user desired position on the first image by user dropping the second image at the position.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIGS. 10A to 10D are views to explain that the direction in which a user drags the second image is detected and the first image is reduced in the detected direction;

FIGS. 12A and 12B are views to explain that the first image is reduced from the position of the second image when a user drags the second image;

FIGS. 13A to 13C are views to explain that the first image is restored at the display rate as it initially was at the start of the dragging when the user finishes dragging and dropping the second image;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described in combination with the accompanying drawings.

Figure 1:
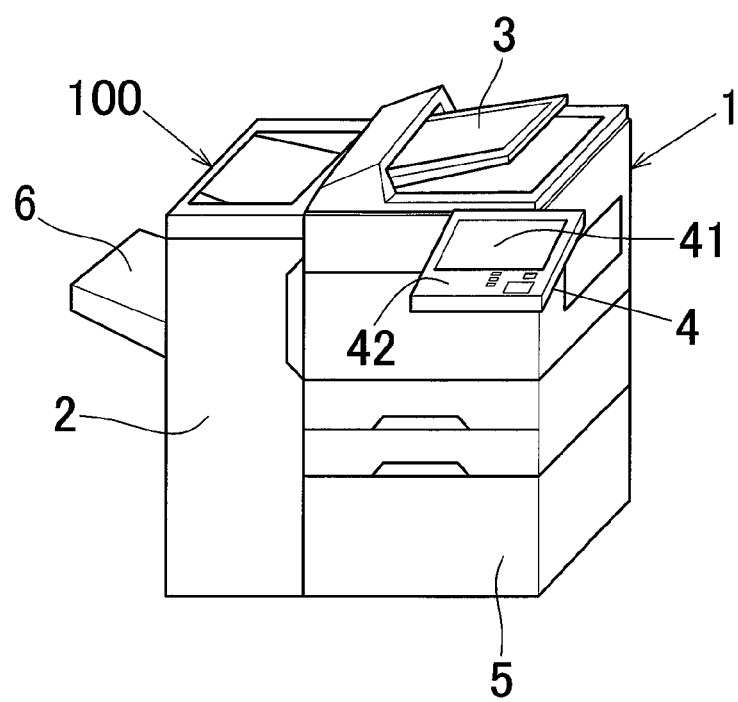
FIG. 1 is an exterior perspective view of an MFP being provided with a display control device according to one embodiment of the present invention.

FIG. 1 is an exterior perspective view of an MFP 100 as a printing apparatus having a display control device according to one embodiment of the present invention.

As illustrated in FIG. 1, the MFP 100 is provided with: a main body 1 containing a printer engine and others; and a finisher 2 that is connected to the body 1.

The main body 1 is provided with: an automatic document feeder 3 that is located on the upper surface of the main body 1; an operation panel 4; and a paper feeder 5. The finisher 2, which is provided with an output paper tray 6 and others, performs finishing work such as punching printed paper.

Figure 2:
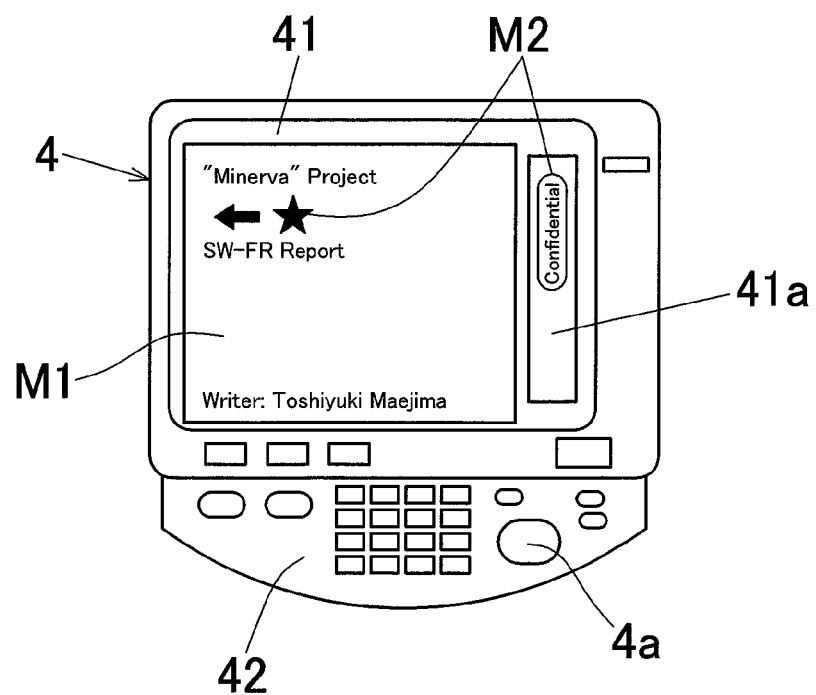
FIG. 2 is a plain view of an operation panel of the MFP.

FIG. 2 is a plain view of the operation panel 4.

As illustrated in FIG. 2, the operation panel 4 is provided with a display 41 and a key input section 42 including a Start button 4a and numeric keys. The display 41 is a liquid-crystal display (LCD), for example, which is touch-screen.

Figure 3:
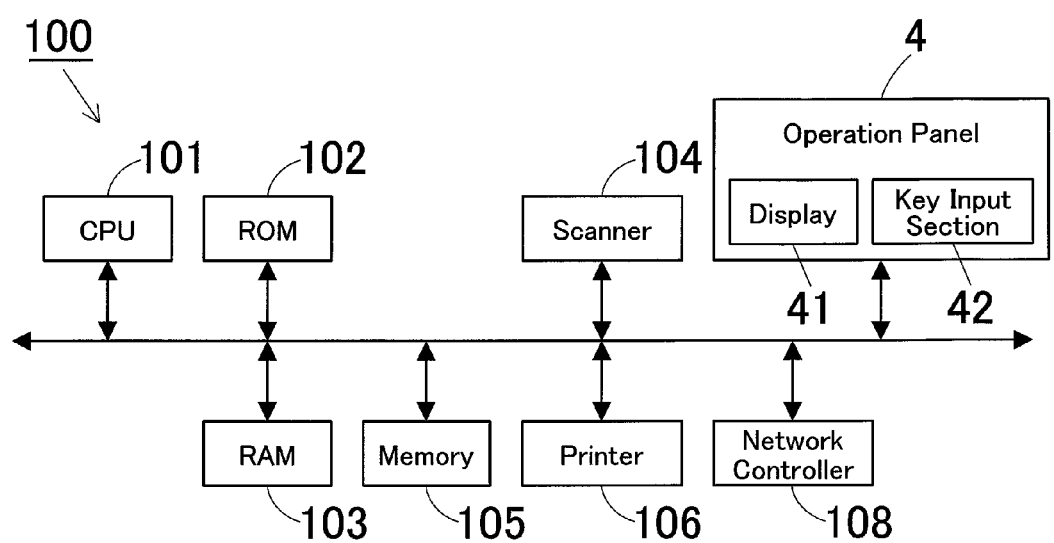
FIG. 3 is a block diagram illustrating the entire configuration of the MFP.

FIG. 3 is a block diagram illustrating the entire electrical configuration of the MFP 100.

As illustrated in FIG. 3, the MFP 100 is provided with: a CPU 101; a ROM 102; a RAM 103; a scanner 104; a memory 105; a printer 106; the above-mentioned operation panel 4; and a network controller (also referred to as NIC).

The CPU 101 controls the entire MFP 100 in a unified and systematic manner to allow use of the basic functions such as copier, printer, scanner, and facsimile functions. More specifically, in this embodiment, the CPU 101 controls the MFP 100 such that a stamp image such as "confidential" or "star" is incorporated into a document image on the display 41 of the operation panel 4, which will be later described in detail.

In this embodiment, the operation panel 4, the CPU 101, and others constitute a display control device. Alternatively, the MFP 100 may be provided with a special CPU for controlling the operation panel 4 so that the special CPU can control the MFP 100 such that a stamp image such as "confidential" or "star" is incorporated into another image on the display 41 of the operation panel 4.

The ROM 102 is a memory that stores operation programs to be executed by the CPU 101 and other data.

The RAM 103 is a memory that provides a work area for the CPU 101 to perform processing in accordance with operation programs.

The scanner 104 is an image reader that reads images on a document put on the automatic document feeder 3 or a platen (not illustrated in this figure) to output image data therefrom.

The memory 105, which is comprised of a non-volatile memory device such as a hard disk drive (HDD), stores the following objects: document images obtained by the scanner 104; print images received from other image forming apparatuses and user terminals; stamp images such as "confidential" and "star" that can be incorporated into another image; and other data.

The printer 106 prints: document images obtained by the scanner 104; print images received from user terminals; and other data, in a specified print mode.

The operation panel 4 serves for user input for settings or instructions. As described previously, the operation panel 4 is provided with: the touch-screen liquid-crystal display 41 for display of messages, operation screens, and others: and the key input section 42.

The network controller 108 establishes data communication by controlling the transmission and receipt of data to and from other image forming apparatuses and external apparatuses such as user terminals, all of which are connected to the network.

As described previously, the MFP 100 allows users to incorporate a stamp image such as "confidential" or "star" into another image on the display 41 of the operation panel 4.

More specifically, when the MFP 100 is in graphics editing mode, a user takes the following steps as illustrated in FIG. 2: displaying a first image M1 as a document image to be stamped, on the display 41 of the operation panel 4; touching a second image M2 as a stamp image such as "confidential" or "star", among those in a stamp list 41a of the display 41; and dragging it toward the first image M1. Then the user drops the second image M2 at a desirable position on the first image M1 to stamp exactly at the position.

FIGS. 4A, 4B, and 4C compose a view to explain an example of the graphics editing.

This is an example on how to incorporate the second image M2 that is a "star" stamp image, into the first image M1; as illustrated in FIG. 4A, a user touches the second image M2 and drags it to the left (as pointed out by the arrow).

Then, as illustrated in FIGS. 4B and 4C, every time the second image M2 moves a certain distance over the first image M1 by the user dragging, the first image M1 is automatically reduced on the display 41. Meanwhile, the second image M2, which is moving, is also reduced at the same reduction rate as the first image M1.

This does not mean that the display size of the display 41 changes but it means that a reduced version of the first image M1 is automatically displayed on the display 41 while the second image M2 is moving, thus the user can obtain a larger area of the first image M1 thereon.

As a result, the user would not have to suffer any more from the difficulty in perceiving a large area of the first image M1 including text, symbols, and layout and in dragging the second image M2 to drop exactly at a desirable position on the first image M1, even though the display 41 can show only small screens, compared to those for personal computers. That would not need the user to devote more time to make a reduced version of the first image M1, which is an advantage that improves user-friendliness.

In the above-described embodiment, it is preferred that the maximum reduction rate, at which the first image M1 and the second image M2 are reduced, be adjusted such that the displayed range for the first image M1 on the display 41 meets the effective print range of the first image M1. This is also true for the other embodiments to be described with reference to FIG. 6 and the following figures. That is, the first image M1 is preferred to be reduced at the maximum reduction rate because it will help the user to preview the first image M1 before printing. The first image M1 may be reduced at a higher rate than the maximum reduction rate, which is not practical because it will only bring a poor view of the first image M1. Meanwhile, the first image M1, which is reduced at the maximum reduction rate, does not have to be displayed all the time until the user drops the second image M2. The user may drop the second image M2 while the first image M1, whose reduction rate is increasing up to the maximum reduction rate, is displayed.

Also, it is preferred that the reduction rate, at which the first image M1 is reduced while the second image M2 is moving, be adjusted on the basis of the size of the effective print range of the first image M1. This is also true for the other embodiments to be described with reference to FIG. 6 and the following figures.

When the user drops the second image M2 at a desirable position on the first image M1, the second image M2 is given to the drop position (incorporated into the first image M1) and the first image M1 appears on the display 41 along with the second image M2.

When the user give instructions to print the first image M1, the first image M1 is printed on paper along with the second image M2.

Figure 4:
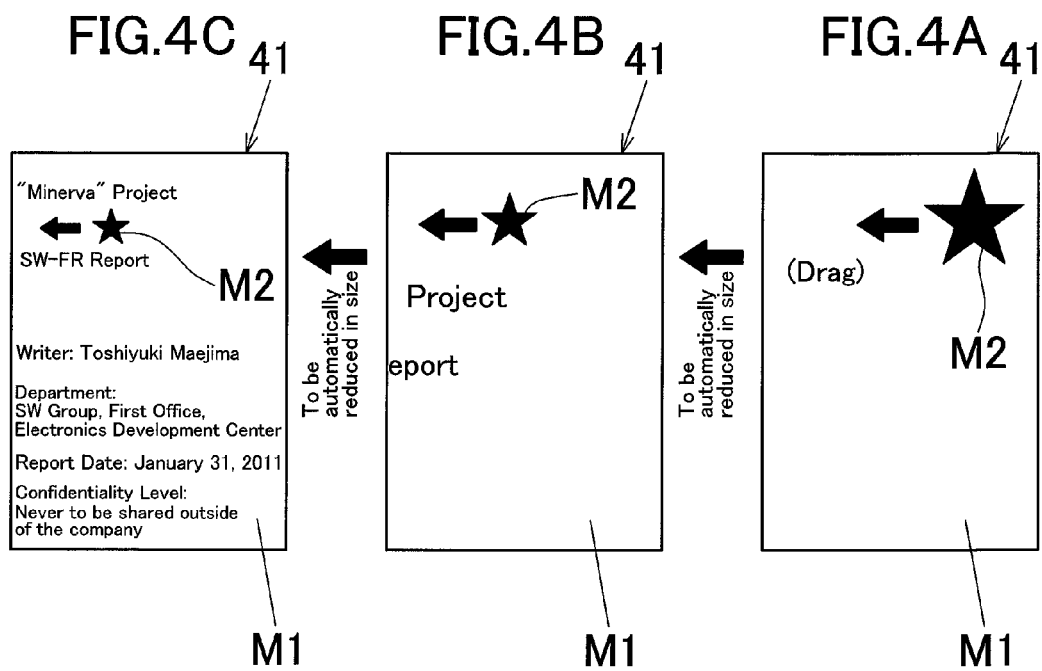
FIGS. 4A to 4C are views to explain that a user is allowed to incorporate the second image into the first image by dragging and dropping the second image to the first image on the display.
Figure 5:
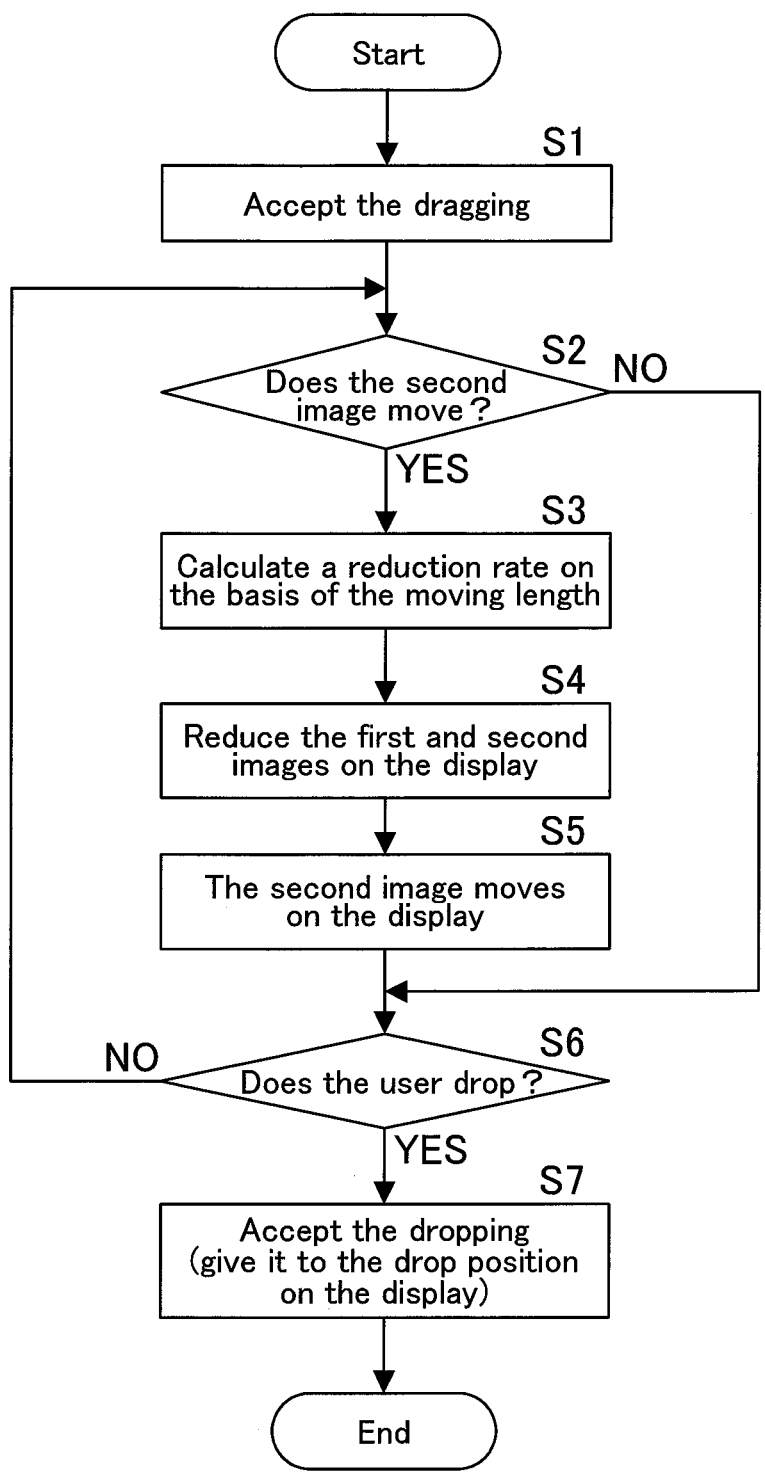
FIG. 5 is a flowchart representing the operation to be performed by the MFP in the embodiment of FIGS. 4A to 4C.

FIG. 5 is a flowchart representing the operation to be performed by the MFP 100 in the embodiment of FIG. 4. This operation and the other operations of the flowcharts of FIG. 7 and the following figures are executed by the CPU 101 in accordance with operation programs stored on a recording medium such as the ROM 102.

In Step S1 of FIG. 5, the user drags the second image M2 and this operation is accepted; it is judged in Step S2 whether or not the second image M2 moves over the first image M1. If the second image M2 does not move over the first image M1 (NO in Step S2), the routine proceeds to Step S6. If the second image M2 moves over the first image M1 (YES in Step S2), the reduction rate is calculated on the basis of the moving length of the second image M2 in Step S3.

Subsequently, the first image M1 and the second image M2 are reduced at the calculated reduction rate on the display in Step S4. And in Step S5, the second image M2 moves over the first image M1 on the display by the user dragging. Then the routine proceeds to Step S6.

In Step S6, it is judged whether or not the user drops the second image M2. If the user drops the second image M2 (YES in Step S6), this operation is accepted in Step S7, i.e., the second image M2 is given to the drop position on the first image M1 on the display. Then the routine terminates. If the user does not drop the second image M2 (NO in Step S6), the routine returns to Step S2.

FIGS. 6A, 6B, and 6C illustrate another embodiment of the present invention. In this embodiment, a plurality of sets of moving distance and reduction rate of the second image M2 are registered in advance.

Specifically, as illustrated in FIG. 6A, a user drags the second image M2 for a plurality of moving distances, for example, two moving distances: a first moving distance D1 and a second moving distance D2 that are specified in advance. And reduction rates for the first moving distance D1 and the second moving distance D2 are also specified in advance. These elements are stored on the memory 105. Here, the second image M2 starts moving the first moving distance D1 and the second moving distance D2 at a point of the side of the first image M1; however, it should be understood that the start point is in no way limited to the example.

When the user drags the second image M2 for the first moving distance D1 to the left (as pointed out by the arrow), the first image M1 and the second image M2 are reduced at a reduction rate that is specified in advance, as illustrated in FIG. 6B.

When the user drags the second image M2 for the second moving distance D2 to the left, the first image M1 and the second image M2 are reduced at a higher reduction rate that is specified in advance, as illustrated in FIG. 6C. Thus the user can obtain a larger area of the first image M1 on the display.

In the above-described embodiment, for a longer moving distance the user drags the second image M2, at a higher reduction rate the first image M1 and the second image M2 will be reduced. As a result, the user would not have to suffer any more from the difficulty in perceiving a large area of the first image M1 including text, symbols, and layout and in dragging the second image M2 to drop exactly at a desirable position on the first image M1, which is an advantage that improves user-friendliness.

When the user again touches and drags the second image M2 after dropping, the dropping will be canceled and the operation will continue as if the user did not drop it. When the user drags the second image M2 to the right after dragging to the left, the first image M1 and the second image M2 may be enlarged in contrast to the above or reduced at a yet higher reduction rate for the moving distance, which is specified in advance. When the user drags the second image M2 vertically or obliquely, the first image M1 and the second image M2 may be reduced at a reduction rate for the moving distance, which is specified in advance.

Figure 6:
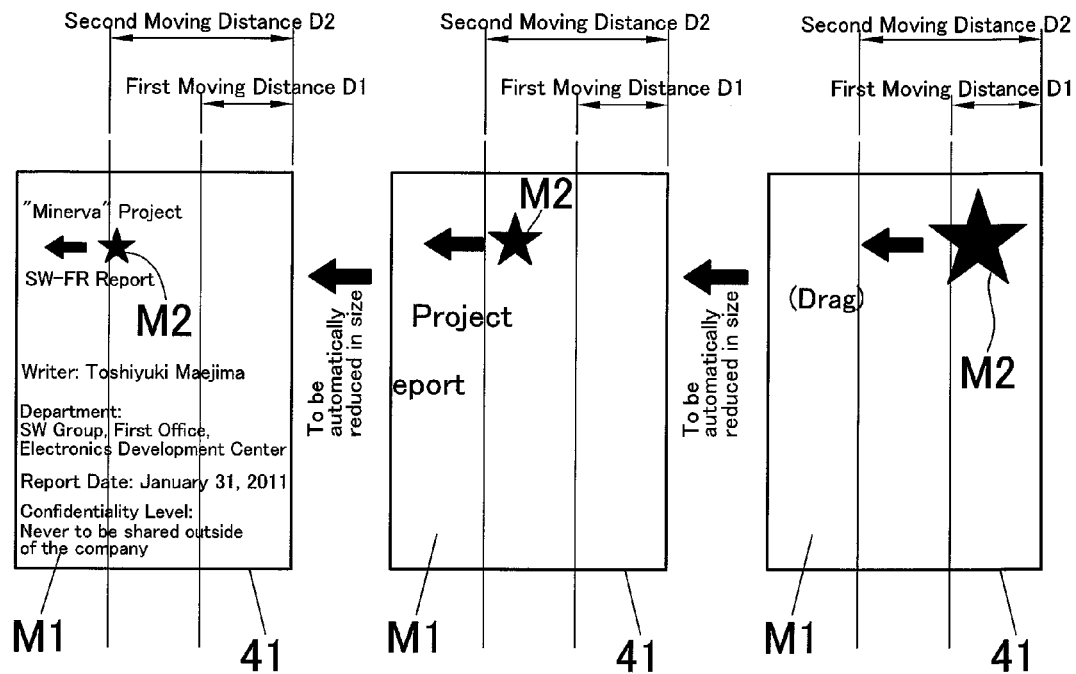
FIGS. 6A to 6C are views to explain how a user is allowed to incorporate the second image into the first image if a plurality of moving distances and reduction rates for the moving distances are stored in advance.
Figure 7:
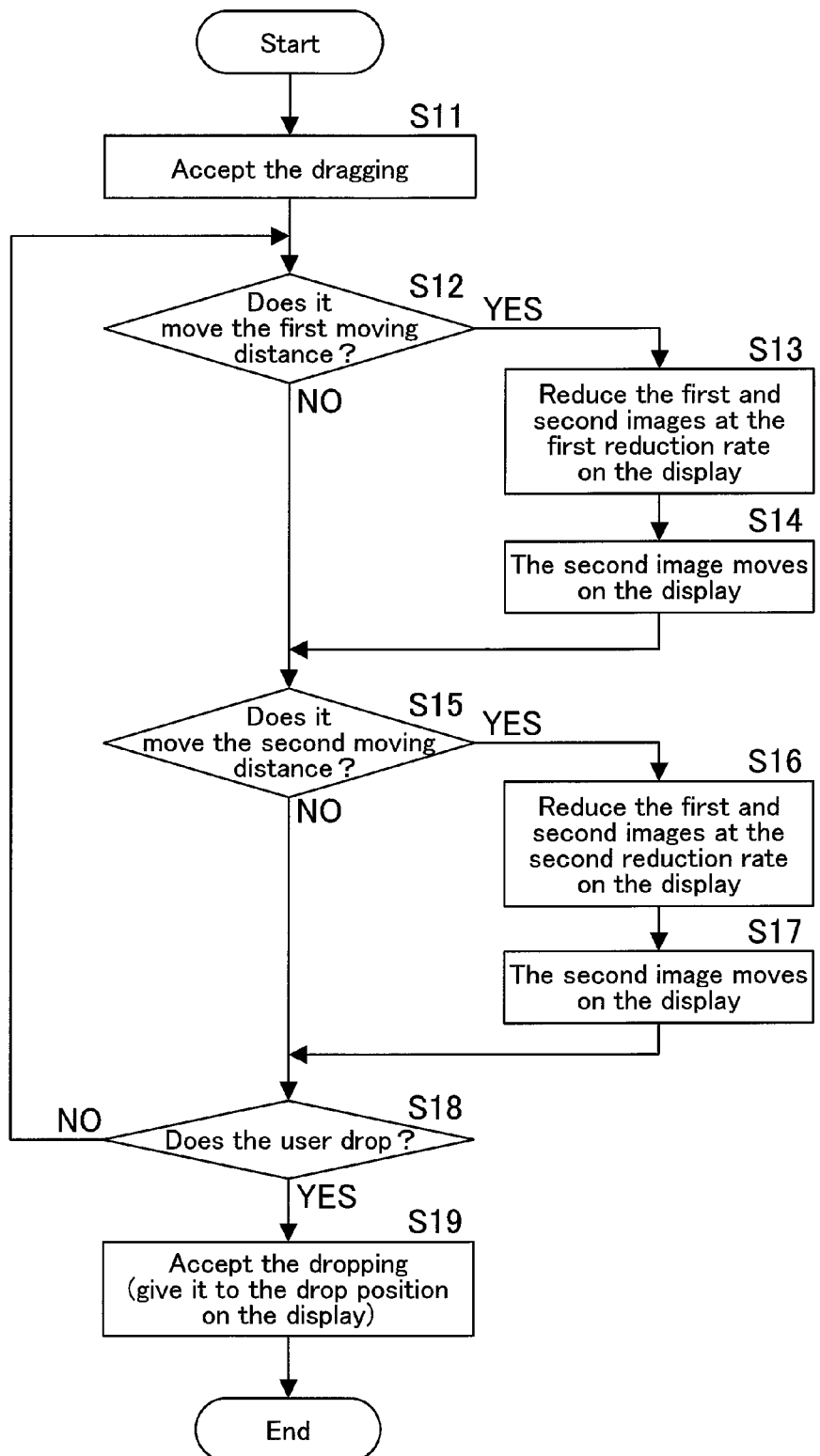
FIG. 7 is a flowchart representing the operation to be performed by the MFP in the embodiment of FIGS. 6A to 6C.

FIG. 7 is a flowchart representing the operation to be performed by the MFP 100 in the embodiment of FIG. 6.

In Step S11, the user drags the second image M2 and this operation is accepted; it is judged in Step S12 whether or not the second image M2 moves the first moving distance D1. If the second image M2 moves the first moving distance D1 (YES in Step S12), the first image M1 and the second image M2 are reduced at a first reduction rate that is specified in advance, on the display in Step S13. And in Step S14, the second image M2 moves over the first image M1 on the display by the user dragging. Then the routine proceeds to Step S15. In Step S12, if the second image M2 does not move the first moving distance D1 (NO in Step S12), the routine directly proceeds to Step S15.

In Step S15, it is judged whether or not the second image M2 moves the second moving distance D2 by the user dragging. If the second image M2 moves the second moving distance D2 (YES in Step S15), the first image M1 and the second image M2 are reduced at a second reduction rate that is specified in advance, on the display in Step S16. In Step S17, the second image M2 moves over the first image M1 on the display by the user dragging. Then the routine proceeds to Step S18. In Step S15, if the second image M2 does not move the second moving distance D2 (NO in Step S15), the routine directly proceeds to Step S18.

In Step S18, it is judged whether or not the user drops the second image M2. If the user drops the second image M2 (YES in Step S18), this operation is accepted in Step S19, i.e., the second image M2 is given to the drop position on the first image M1 on the display. Then the routine terminates. If the user does not drop the second image M2 (NO in Step S19), the routine returns to Step S12.

FIGS. 8A, 8B, and 8C illustrate yet another embodiment of the present invention. In this embodiment, a blank area of the first image M1 appears on the display 41. When a user drags the second image M2 over the blank area, the first image M1 and the second image M2 are reduced at a reduction rate that is high enough for such a case.

When the user drags the second image M2 to the left (as pointed out by the arrow) over a blank area of the first image M1 on the display 41 as illustrated in FIG. 8A, the first image M1 and the second image M2 are reduced at a reduction rate much higher than that in the other case where any blank area does not appear on the display 41, as illustrated in FIG. 8B.

After that, when the user drags the second image M2 over not a blank area of the first image M1 on the display 41, the first image M1 and the second image M2 are reduced at a normal reduction rate as illustrated in FIG. 8C.

In the above-described embodiment, if a blank area of the first image M1 appears on the display 41, the first image M1 and the second image M2 are reduced at a reduction rate much higher than that in the other case where any blank area does not appear on the display 41. As a result, the user would not have to suffer any more from the difficulty in perceiving text, symbols, layout, and other elements of the first image M1 and in dragging the second image M2 to drop exactly at a desirable position on the first image M1.

Figure 8:
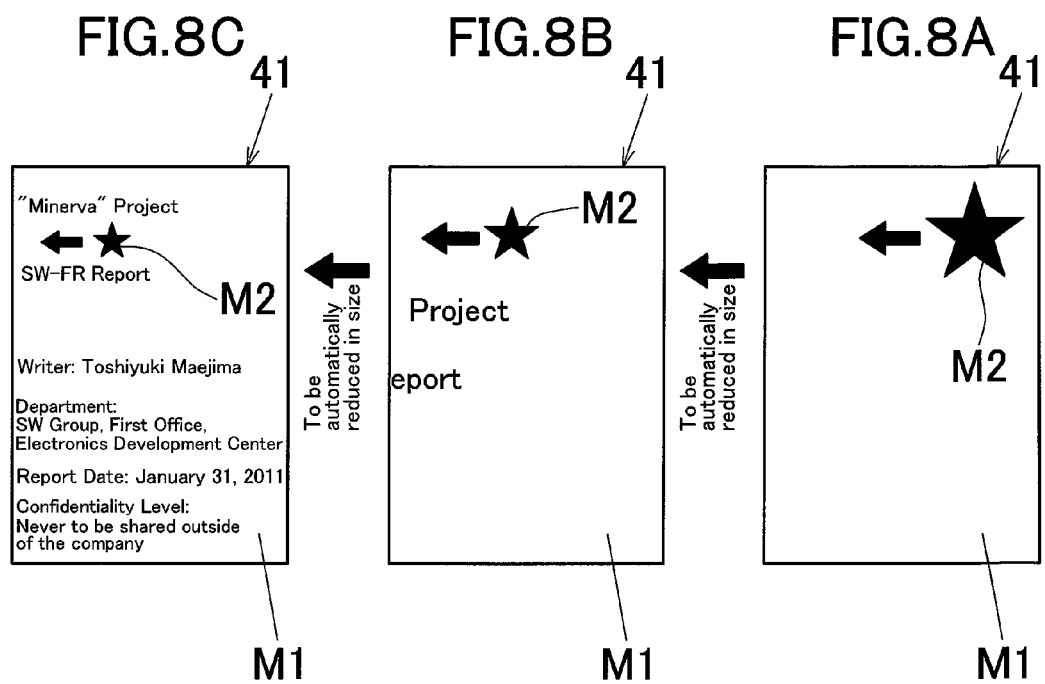
FIGS. 8A to 8C are views to explain how a user is allowed to drag the second image to the first image if a blank area of the first image appears on the display.
Figure 9:
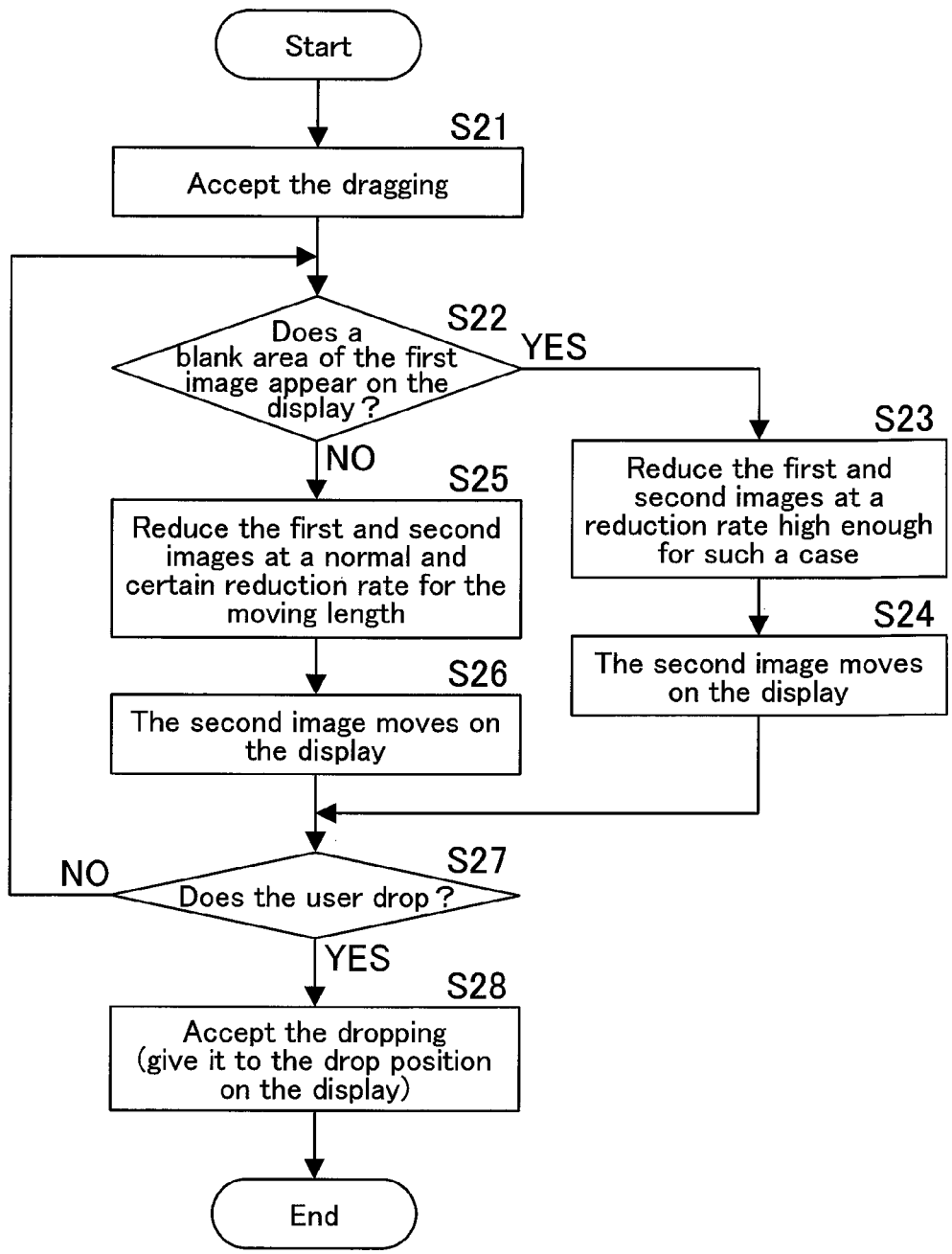
FIG. 9 is a flowchart representing the operation to be performed by the MFP in the embodiment of FIGS. 8A to 8C.

FIG. 9 is a flowchart representing the operation to be performed by the MFP 100 in the embodiment of FIG. 8.

in Step S21, the user drags the second image M2 and this operation is accepted; it is judged in Step S22 whether or not a blank area of the first image M1 appears on the display 41. If a blank area of the first image M1 appears (YES in Step S22), the first image M1 and the second image M2 are reduced at a reduction rate that is specified in advance and high enough for such a case, on the display in Step S23. In Step S24, the second image M2 moves over the first image M1 on the display by the user dragging. Then the routine proceeds to Step S27. In Step S22, if a blank area of the first image M1 does not appear (NO in Step S22), the first image M1 and the second image M2 are reduced at a normal reduction rate for the moving length of the second image M2, which is specified in advance, on the display in Step S25. Subsequently, the second image M2 moves over the first image M1 on the display by the user dragging in Step S26. Then the routine proceeds to Step S27.

In Step S27, it is judged whether or not the user drops the second image M2. If the user drops the second image M2 (YES in Step S27), this operation is accepted in Step S28, i.e., the second image M2 is given to the drop position on the first image M1 on the display. Then the routine terminates. If the user does not drop the second image M2 (NO in Step S27), the routine returns to Step S22.

FIGS. 10A, 10B, and 10C illustrate still yet another embodiment of the present invention. In this embodiment, when a user drags the second image M2, the direction to which the user drags the second image M2 is detected and the first image M1 and the second image M2 are reduced in the detected direction.

When the user drags the second image M2 over the first image M1 on the display 41, whose original copy is illustrated in FIG. 10D, horizontally or vertically as illustrated in FIG. 10A, the first image M1 and the second image M2 are reduced in the drag direction.

For example, when the user drags the second image M2 to the left to drop at a desirable position, the first image M1 and the second image M2 will be horizontally reduced at a reduction rate for the moving distance, which is specified in advance, on the display, as illustrated in FIG. 10B.

And when the user drags the second image M2 downward to drop at a desirable position, the first image M1 and the second image M2 will be vertically reduced at a reduction rate for the moving length, which is specified in advance, then will be displayed on the display, as illustrated in FIG. 10C.

In the above-described embodiment, the first image M1 and the second image M2 are reduced in the direction in which the second image M2 moves. As a result, in whichever direction the user drags the second image M2, he/she would not have to suffer any more from the difficulty in dragging the second image M2 to drop exactly at a desirable position on the first image M1.

Figure 11:
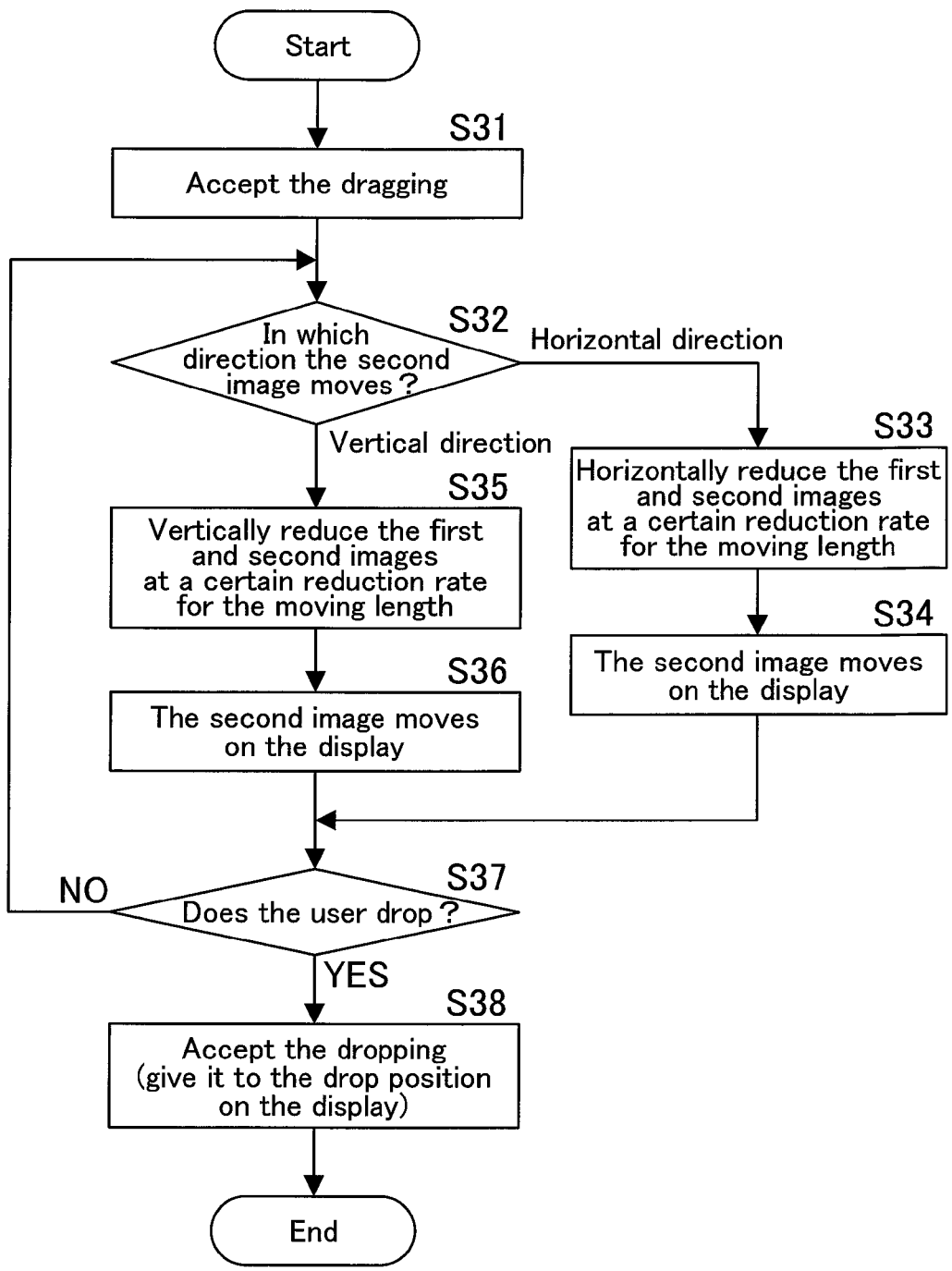
FIG. 11 is a flowchart representing the operation to be performed by the MFP in the embodiment of FIGS. 10A to 10D.

FIG. 11 is a flowchart representing the operation to be performed by the MFP 100 in the embodiment of FIG. 10.

in Step S31, the user drags the second image M2 and this operation is accepted; it is judged in Step S32 in which direction the second image M2 moves.

If it moves horizontally, the routine proceeds to Step S33; if it moves vertically, the routine proceeds to Step S35.

After the second image M2 moves horizontally, the first image M1 and the second image M2 are reduced at a reduction rate for the moving length, which is specified in advance, on the display in Step S33. And in Step S34, the second image M2 moves over the first image M1 on the display by the user dragging. Then the routine proceeds to Step S37.

After the second image M2 moves vertically, the first image M1 and the second image M2 are reduced at a reduction rate for the moving length, which is specified in advance, on the display in Step S35. And in Step S34, the second image M2 moves over the first image M1 on the display by the user dragging. Then the routine proceeds to Step S37.

In Step S37, it is judged whether or not the user drops the second image M2. If the user drops the second image M2 (YES in Step S37), this operation is accepted in Step S38, i.e., the second image M2 is given to the drop position on the first image M1 on the display. Then the routine terminates. If the user does not drop the second image M2 (NO in Step S37), the routine returns to Step S32.

In the embodiment of FIGS. 10 and 11, the user drags the second image M2 horizontally and vertically; alternatively, the user may drag the second image M2 obliquely upward and downward. In this case, it is preferred that the first image M1 and the second image M2 be reduced horizontally and vertically every time the second image M2 moves a certain distance horizontally and another certain distance vertically.

FIGS. 12A and 12B illustrate further still yet another embodiment of the present invention. In this embodiment, the first image M1 is reduced from the position of the second image M2 when a user drags the second image M2.

When a user drags the second image M2 to the left over the first image M1 on the display 41 as illustrated in FIG. 12A, the first image M1 and the second image M2 are automatically reduced at a reduction rate for the moving distance of the second image M2, which is specified in advance, as illustrated in FIG. 12B.

The base point for the reduction (base point for resizing) is adjusted at the position of the second image M2, i.e., the position at which the user touches the "star" stamp image by the finger. The first image M1 and the second image M2 are reduced from the position of the second image M2 as illustrated in FIG. 12B. The same is true when the user drags the second image M2 vertically and obliquely upward and downward. As illustrated in FIGS. 12A and 12B, the first image M1 and the second image M2 may be reduced horizontally and vertically from the position of the second image M2, i.e., in the X and Y directions from the base point.

In the above-described embodiment, the first image M1 and the second image M2 are reduced from a base point that is the position at which the user touches the second image M2 by the finger, thus the user can obtain a larger area of the first image M1 on the display. As a result, the user would not have to suffer any more from the difficulty in editing.

FIGS. 13A, 13B, and 13C illustrate further still yet another embodiment of the present invention. In this embodiment, the first image M1 and the second image M2 are restored to the display size as it initially was at the start of the dragging when a user finishes dragging and dropping the second image M2.

Here, the user drags the second image M2 for a plurality of moving distances, for example, two moving distances: a first moving distance D1 and a second moving distance D2 are specified in advance. And reduction rates for the first moving distance D1 and the second moving distance D2 are also specified in advance.

When the user drags the second image M2 for the first moving distance D1 to the left, the first image M1 and the second image M2 are reduced at a reduction rate that is specified in advance, as illustrated in FIG. 13B.

When the user drags the second image M2 for the second moving distance D2 to the left, the first image M1 and the second image M2 are reduced at a higher reduction rate that is specified in advance. When the user drops it at a desirable position over the second moving distance, the first image M1 and the second image M2 are restored at the display rate as it initially was at the start of the dragging, on the display as illustrated in FIG. 13C. The display rate as it initially was at the start of the dragging needs to be stored on the memory 105.

In the above-described embodiment, when the user drops the second image M2, the first image M1 and the second image M2 are restored at the display rate as it initially was at the start of dragging, thus the user can obtain the first image M1 in the initial display size again on the display. As a result, the user would not have to suffer any more from the difficulty in dropping exactly at a desirable position.

Figure 14:
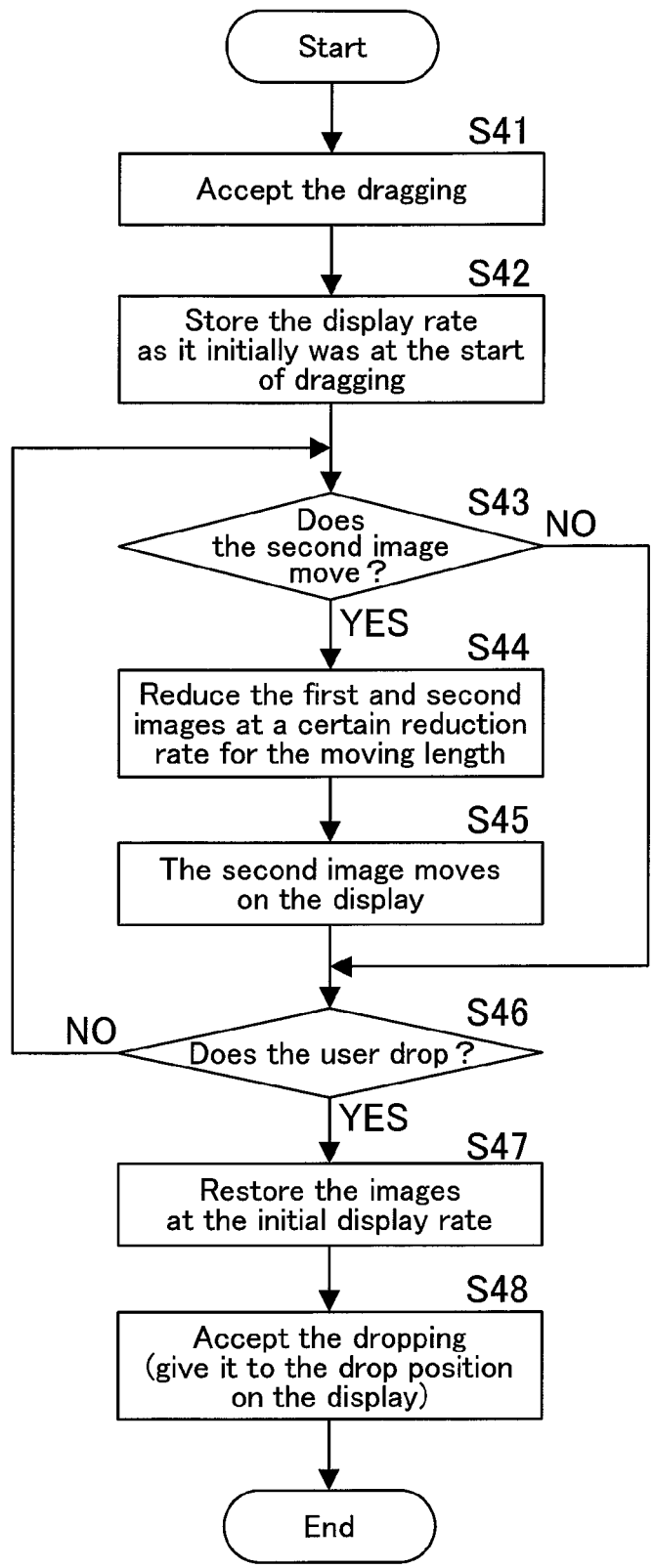
FIG. 14 is a flowchart representing the operation to be performed by the MFP in the embodiment of FIGS. 13A to 13C.

FIG. 14 is a flowchart representing the operation to be performed by the MFP 100 in the embodiment of FIG. 13.

In Step S41, the user drags the second image M2 and this operation is accepted; in Step S42, the initial display rate of the first image M1 (as it initially was at the start of the dragging) is stored on the memory 105.

Then in Step S43, it is judged whether or not the second image M2 moves over the first image M1. If the second image M2 does not move over the first image M1 (NO in Step S43), the routine proceeds to Step S46. If the second image M2 moves over the first image M1 (YES in Step S43), the first image M1 and the second image M2 are reduced at a reduction rate for the moving length of the second image M2, which is specified in advance, in Step S44. Subsequently, the second image M2 moves over the first image M1 on the display by the user dragging in Step S45. Then the routine proceeds to Step S46.

In Step S46, it is judged whether or not the user drops the second image M2. If the user does not drop the second image M2 (NO in Step S46), the routine returns to Step S42. If the user drops the second image M2 (YES in Step S46), the first image M1 and the second image M2 are restored at the display rate as it initially was at the start of the dragging, which is stored on the memory 105, in Step S47.

And the dropping is accepted in Step S48, i.e., the second image M2 is given to the drop position on the first image M1 on the display. Then the routine terminates.

In the aforementioned embodiment, the first image M1 and the second image M2 are reduced at a reduction rate for the moving length of the second image M2, which is specified in advance. Alternatively, the first image M1 and the second image M2 may be reduced at a reduction rate that is calculated on the basis of the moving length and either of the moving speed and acceleration of the second image M2.

Figure 15:
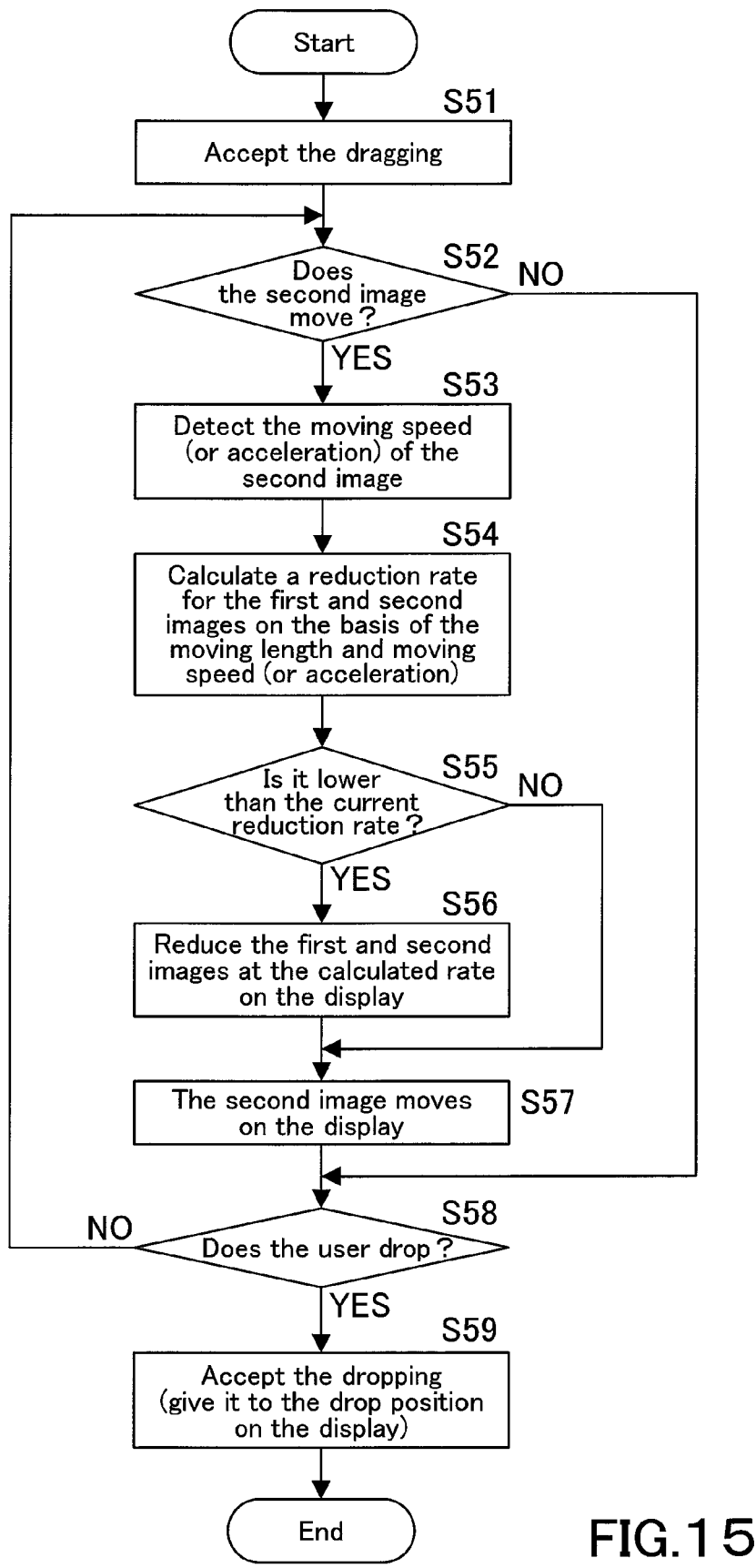
FIG. 15 is a flowchart representing the operation to be performed by the MFP, in which the first image is reduced at a reduction rate that is calculated on the basis of the moving length and either of the moving speed and acceleration of the second image.
Figure 16C:
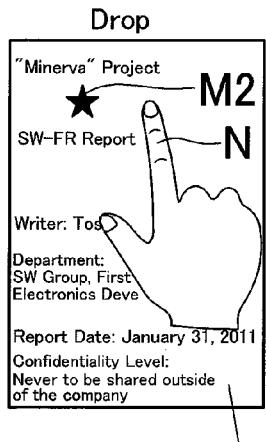
FIGS. 16A to 16C are views to explain a general example in which a user is allowed to incorporate the second image into the first image by dropping the second image at a desirable position.
Figure 16B:
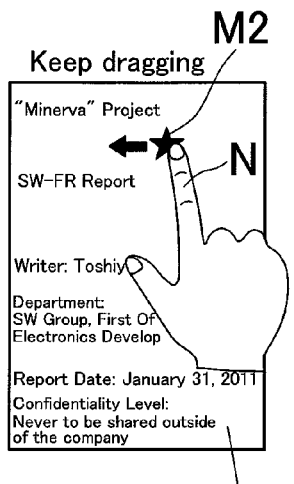
Figure 16A:
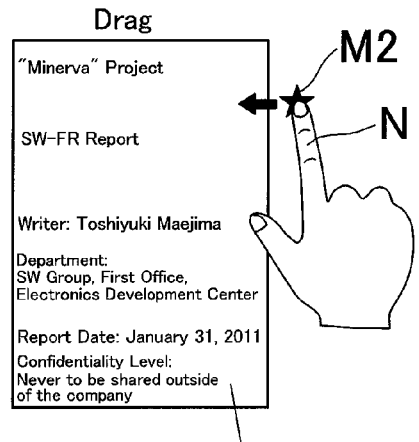
Figure 17:
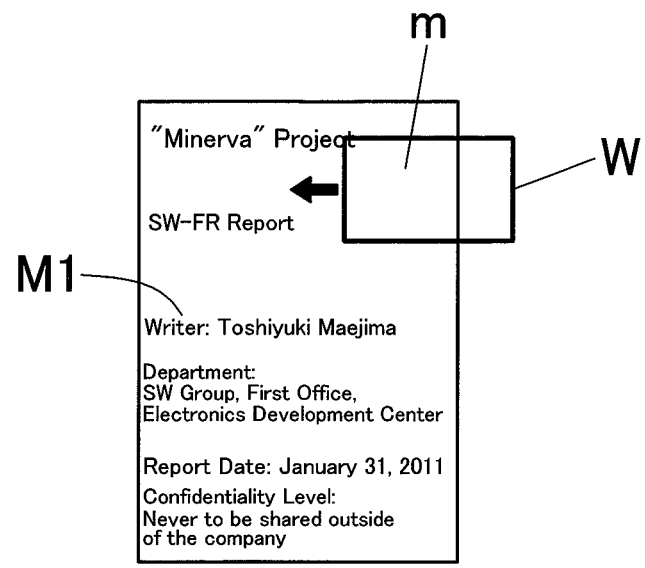
FIG. 17 is a view to explain that a user is allowed to see only a part of the first image if the MFP has an operation panel whose display is relatively small.
Figure 18:
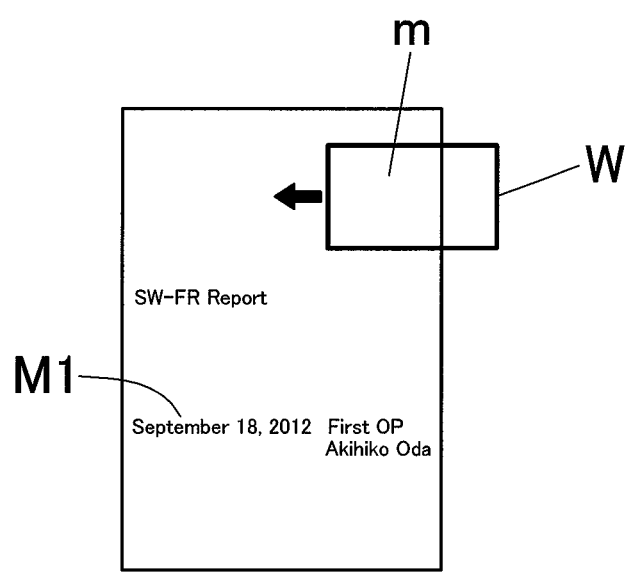
FIG. 18 is a view to explain how a user is allowed to incorporate the second image into the first image if a blank area of the first image appears on the display.
Figure 19:
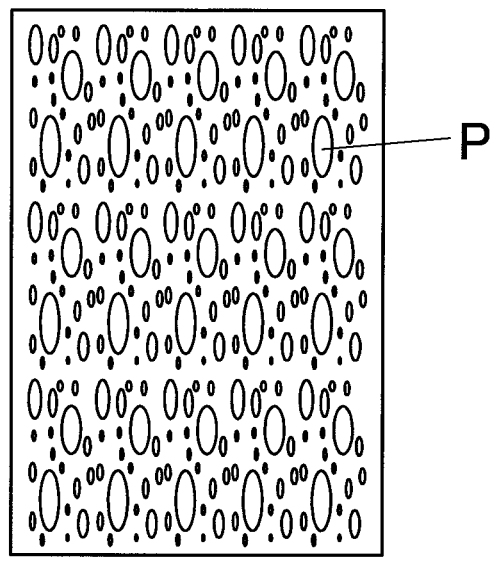
FIG. 19 is a view to explain how a user is allowed to incorporate the second image into the first image if only a tiled pattern of the first image appears on the display.

FIG. 15 is a flowchart representing the operation to be performed by the MFP 100, in which the first image M1 and the second image M2 are reduced at a reduction rate that is calculated on the basis of the moving length and either of the moving speed and acceleration.

In Step S51, the user drags the second image M2 and this operation is accepted; it is judged in Step S52 whether or not the second image M2 moves over the first image M1. If the second image M2 does not move over the first image M1 (NO in Step S52), the routine proceeds to Step S58. If the second image M2 moves over the first image M1 (YES in Step S52), either of the moving speed and acceleration of the second image M2 is detected in Step S53, and a reduction rate is calculated on the basis of the moving length and either of the detected moving speed and acceleration of the second image M2 in Step S54.

Then in Step S55, it is judged whether or not the calculated reduction rate is lower than the current reduction rate. If it is lower than the current one (YES in Step S55), the first image M1 and the second image M2 are reduced at the calculated reduction rate on the display in Step S56. Then the routine proceeds to Step S57. If the calculated reduction rate is not lower than the current reduction rate (NO in Step S55), the routine directly proceeds to Step S57.

Subsequently, the second image M2 moves over the first image M1 on the display by the user dragging in Step S57. Then the routine proceeds to Step S58.

In Step S58, it is judged whether or not the user drops the second image M2. If the user does not drop the second image M2 (NO in Step S58), the routine returns to Step S52. If the user drops the second image M2 (YES in Step S58), the dropping is accepted in Step S59, i.e., the second image M2 is given to the drop position on the first image M1 on the display. Then the routine terminates.

In the aforementioned embodiment, a reduction rate is calculated on the basis of the moving length and either of the moving speed and acceleration of the second image M2; thus, when bothered by keeping dragging the image to a desirable position for a long distance, the user can immediately obtain a reduced version of the first image M1 on the display by speeding up or accelerating the dragging. As a result, the user would not have to suffer any more from the difficulty in editing.

While more than one embodiment of the present invention has been described in detail herein and shown in the accompanying drawings, it should be understood that the present invention is not limited to the foregoing embodiments.

For example, in these embodiments, both the first image M1 and the second image M2 are reduced at a common reduction rate for the moving length (moving distance) of the second image M2. Alternatively, only the first image M1 may be reduced. However, it is preferred that the second image M2 also be reduced as well as the first image M1 at the same reduction rate as that for the first image M1, because the user can obtain the reduced versions of the first image M1 and the second image M2 in the actual ratio between them. As a result, the user would not have to suffer any more from the difficulty in dropping the second image M2 exactly at a desirable position.

Furthermore, the display control device is installed on the MFP 100 in these embodiments, which does not mean that it is necessarily limited to a MFP: the display control device may be installed on a portable terminal apparatus such as a tablet computer terminal, or another apparatus.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A display control device comprising:
a display that displays a first image and a second image; and
a processor configured to:
judge whether or not the second image moves a certain distance in response to a drag operation by a user to drag the second image to an arbitrary position of the first image on the display;

control the display to display a larger area of the first image at least by reducing a magnification of the first image if it is judged that the second image moves the certain distance; and give the second image a user desired position on the first image when the user drops the second image at the user desired position when the drag operation is finished, wherein when reducing the magnification of the first image, the processor changes the magnification of the first image based on a distance that the second image moves so as to enlarge a viewable area of the first image in accordance with a change in the magnification of the first image.

2. The display control device as recited in claim 1, further comprising:

a memory that stores a plurality of moving distances and corresponding reduction rates for the stored moving distances, wherein:

the processor is further configured to judge whether or not the second image moves any one of the stored moving distances; and if it is judged that the second image moves any one of the stored moving distances, the magnification of the first image is reduced at the corresponding reduction rate for said any one of the stored moving distances.

3. The display control device as recited in claim 1, wherein:

the processor is further configured to judge whether or not a blank area of the first image appears on the display while the second image is moving; and if it is judged that the blank area of the first image appears on the display, the magnification of the first image is reduced at a higher reduction rate than if the blank area of the first image is not judged to appear on the display.

4. The display control device as recited in claim 1, further comprising:

a moving direction detector that detects a direction in which the second image moves, wherein the processor reduces the magnification of the first image in the direction detected by the moving direction detector.

5. The display control device as recited in claim 1, wherein the processor reduces the magnification of the first image from a base point that is a position of the second image.

6. The display control device as recited in claim 1, further comprising:

a memory that stores an initial display rate of the first image when the drag operation begins, wherein, when the user drops the second image at the user desired position when the drag operation is finished, the processor is further configured to control the display to hide the reduced first image and display the first image that is restored to the initial display rate stored in the memory.

7. The display control device as recited in claim 1, further comprising:

a detector that detects one of a moving speed and an acceleration of the second image, wherein the processor reduces the magnification of the first image at a reduction rate that is calculated based on the one of the moving speed and the acceleration of the second image detected by the detector.

8. The display control device as recited in claim 1, wherein:

said display control device is configured to be installed on a printing apparatus; and the processor is further configured to adjust a reduction rate at which the magnification of the first image is reduced based on a size of an effective print range of the first image.

9. The display control device as recited in claim 1, wherein:

said display control device is configured to be installed on a printing apparatus; and the processor is further configured to adjust a maximum reduction rate, at which the magnification of the first image is reduced, such that a displayed range for the first image on the display meets an effective print range of the first image.

10. The display control device as recited in claim 1, wherein the processor is further configured to reduce the second image on the display as well as the first image, at a same reduction rate.

11. A display control method comprising:

displaying a first image and a second image on a display;

judging whether or not the second image moves a certain distance in response to a drag operation by a user to drag the second image to an arbitrary position of the first image on the display;

controlling the display to display a larger area of the first image at least by reducing a magnification of the first image if it is judged that the second image moves the certain distance; and giving the second image a user desired position on the first image when the user drops the second image at the user desired position when the drag operation is finished, wherein in the controlling, when reducing the magnification of the first image, the magnification of the first image is changed based on a distance that the second image moves so as to enlarge a viewable area of the first image in accordance with a change in the magnification of the first image.

12. A non-transitory computer-readable recording medium having a display control program stored thereon for controlling a computer of a display control device to execute operations comprising:

displaying a first image and a second image on a display;

judging whether or not the second image moves a certain distance in response to a drag operation by a user to drag the second image to an arbitrary position of the first image on the display;

controlling the display to display a larger area of the first image at least by reducing a magnification of the first image if it is judged that the second image moves the certain distance; and giving the second image a user desired position on the first image when the user drops the second image at the user desired position when the drag operation is finished, wherein in the controlling, when reducing the magnification of the first image, the magnification of the first image is changed based on a distance that the second image moves so as to enlarge a viewable area of the first image in accordance with a change in the magnification of the first image.

13. The non-transitory computer-readable recording medium as recited in claim 12, wherein the display control program controls the computer of the display control device to further execute:

storing a plurality of moving distances and corresponding reduction rates for the stored moving distances; and judging whether or not the second image moves any one of the stored moving distances, wherein, if it is judged that the second image moves any one of the stored moving distances, the magnification of the first image is reduced at the corresponding reduction rate for said any one of the stored moving distances.

14. The non-transitory computer-readable recording medium as recited in claim 12, wherein the display control program controls the computer of the display control device to further execute:
   judging whether or not a blank area of the first image appears on the display while the second image is moving,
   wherein, if it is judged that the blank area of the first image appears on the display, the magnification of the first image is reduced at a higher reduction rate than if the blank area of the first image is not judged to appear on the display.

15. The non-transitory computer-readable recording medium as recited in claim 12, wherein the display control program controls the computer of the display control device to further execute:
   detecting a direction in which the second image moves,
   wherein the magnification of the first image is reduced in the detected direction.

16. The non-transitory computer-readable recording medium as recited in claim 12, wherein the magnification of the first image is reduced from a base point that is a position of the second image.

17. The non-transitory computer-readable recording medium as recited in claim 12, wherein the display control program controls the computer of the display control device to further execute:
   storing an initial display rate of the first image when the drag operation begins; and
   hiding the reduced first image and displaying the first image that is restored to the stored initial display rate on the display when the user drops the second image at the user desired position when the drag operation is finished.

18. The non-transitory computer-readable recording medium as recited in claim 12, wherein the display control program controls the computer of the display control device to further execute:
   detecting one of a moving speed and an acceleration of the second image,
   wherein the magnification of the first image is reduced at a reduction rate that is calculated based on the detected one of the moving speed and the acceleration of the second image.

19. The non-transitory computer-readable recording medium as recited in claim 12, wherein:
   the display control device is configured to be installed on a printing apparatus; and
   the display control program controls the computer of the display control device to further execute adjusting a reduction rate at which the magnification of the first image is reduced based on a size of an effective print range of the first image.

20. The non-transitory computer-readable recording medium as recited in claim 12, wherein:
   the display control device is configured to be installed on a printing apparatus; and
   the display control program controls the computer of the display control device to further execute adjusting a maximum reduction rate, at which the magnification of the first image is reduced, such that a displayed range for the first image on the display meets an effective print range of the first image.

21. The non-transitory computer-readable recording medium as recited in claim 12, wherein the display control program controls the computer of the display control device to further execute reducing the second image on the display as well as the first image, at a same reduction rate.

\* \* \* \* \*